United States Patent [19]
Gray

[11] 3,792,744
[45] Feb. 19, 1974

[54] DRIVE CONTROL APPARATUS FOR VEHICLES

[75] Inventor: Paul D. Gray, Owatonna, Minn.

[73] Assignee: Owatonna Manufacturing Company, Inc., Owatonna, Minn.

[22] Filed: May 19, 1972

[21] Appl. No.: 255,142

[52] U.S. Cl............. 180/6.48, 74/471 XY, 74/491, 180/77 H
[51] Int. Cl............................................ B62d 11/04
[58] Field of Search...................180/6, 48, 77 H, 74/471 R, 471 XY, 491

[56] References Cited
UNITED STATES PATENTS

| | | | |
|---|---|---|---|
| 3,431,993 | 3/1969 | Case | 180/6.48 |
| 3,407,682 | 10/1968 | Yoshizawa et al. | 74/471 |
| 3,616,869 | 11/1971 | Rilling | 180/6.48 |
| 3,224,196 | 12/1965 | Bennett | 180/6.48 X |
| 3,526,153 | 9/1970 | Howell et al. | 74/491 |
| 3,541,877 | 11/1970 | Houk | 74/471 XY |
| 3,572,033 | 3/1971 | Tolley | 180/77 H X |
| 3,611,827 | 10/1971 | Bottum et al. | 74/471 R |
| 3,666,033 | 5/1972 | Haug | 180/6.48 |

*Primary Examiner*—Kenneth H. Betts
*Assistant Examiner*—Leslie J. Paperner
*Attorney, Agent, or Firm*—Merchant, Gould, Smith & Edell

[57] ABSTRACT

Control apparatus for a vehicle driven by a pair of hydraulically operated motors imparting rotation to rotary members at opposite sides of the vehicles. A pair of variable displacement pumps, each hydraulically connected to a different one of the motors, are controlled as to speed and direction by direction and displacement control arms on the pumps, a manually operated control rod, and linkage connecting the control rod with the control arms on the pumps.

6 Claims, 7 Drawing Figures

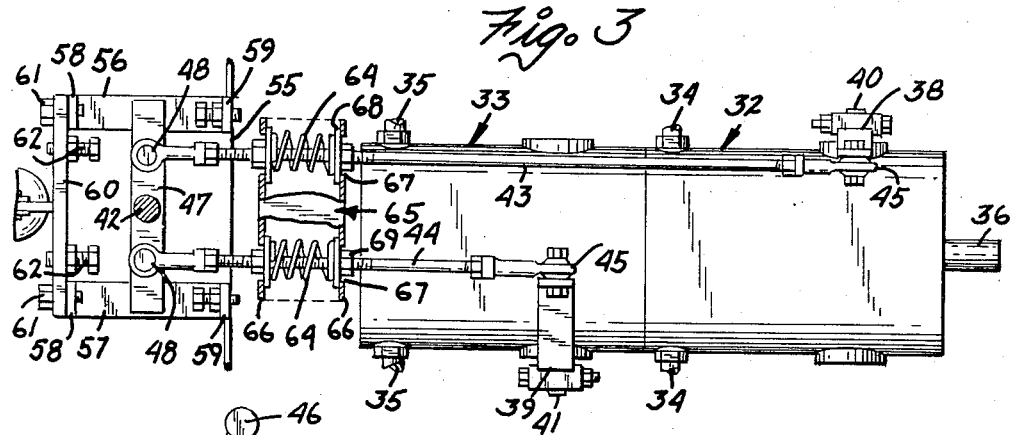
Fig. 3
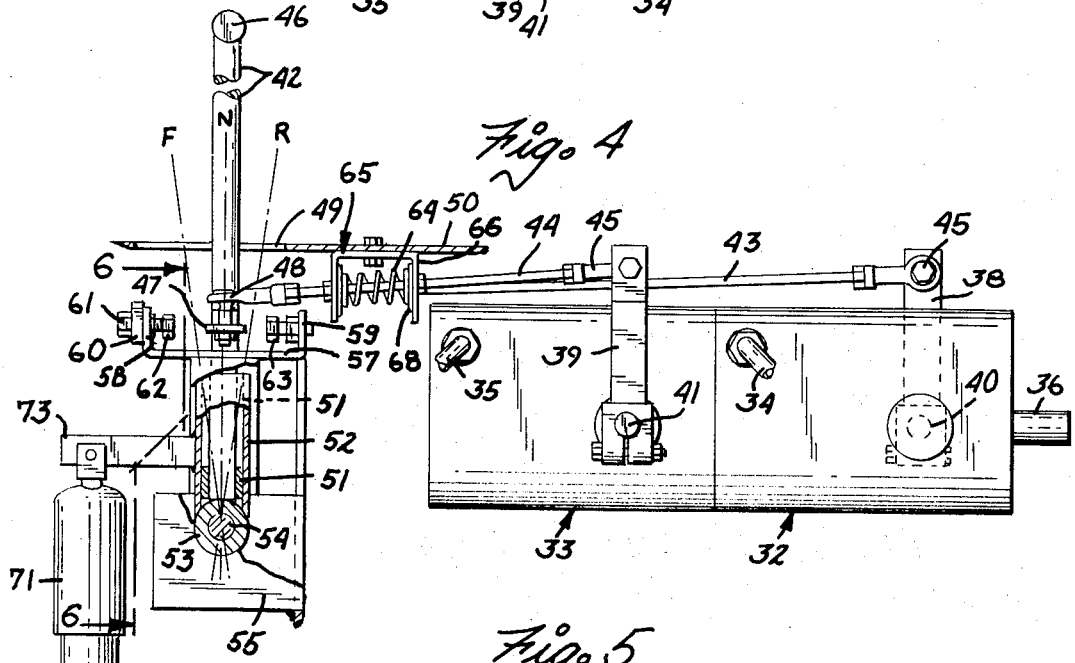
Fig. 4
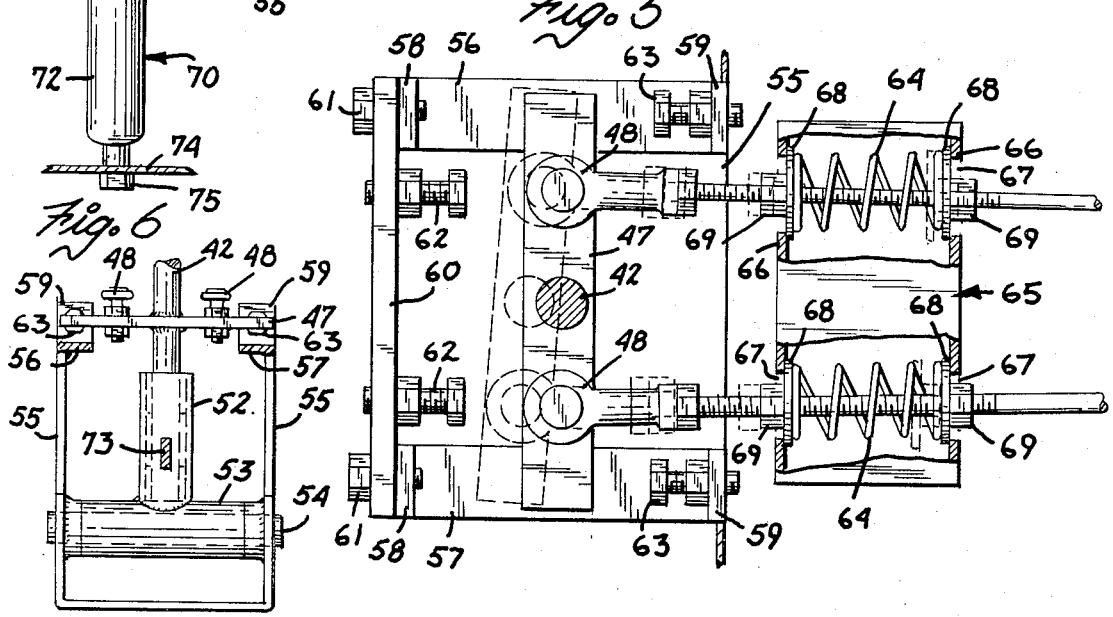
Fig. 5
Fig. 6

DRIVE CONTROL APPARATUS FOR VEHICLES

BACKGROUND OF THE INVENTION

This invention is in the nature of an improvement on vehicle drive and control apparatus generally of the type disclosed in U.S. Letters Pat. No. 3,461,669 to G. G. Kanengieter, 3,581,497 to F. C. Krumholz, and 3,647,011 to D. E. Baumgartner, all assigned to the assignee of this invention. The machines of the patents mentioned above each utilize a manually operated control member for controlling forward and rearward speed, and a second manually operated control member for controlling the steering of the vehicles.

SUMMARY OF THE INVENTION

This invention relates particularly to hydraulically driven vehicles wherein steering is accomplished by a differential in speeds between rotary members on opposite sides of the vehicle.

An important object of this invention is the provision of control apparatus for vehicles, as set forth, which involves a single manually operated control member to control speed of vehicle between full forward, neutral and full reverse speeds, as well as steering of the vehicle.

Another object of this invention is the provision of control apparatus as set forth, wherein the drive and steering mechanism automatically seeks a neutral condition upon release of the manually operated control member by the operator.

Another object of this invention is the provision of control apparatus having damping means for insuring smooth operation of the drive and steering system.

Still another object of this invention is the provision of control apparatus which is adjustable as to degree of speed control and which is exceedingly simple in construction and in its operation.

To the above ends, a control apparatus is provided for a pair of variable displacement pumps each supplying fluid under pressure to a different one of a pair of hydraulic motors imparting rotation to rotary drive members at opposite sides of a vehicle frame. The pumps each have a control arm, the control apparatus including a control rod mounted in the vehicle frame for forward and rearward swinging movements on a transverse axis and for rotation on an axis extending longitudinally of the control rod. A pair of rigid links connect the control rod to the control arms of the pumps in such manner that forward and rearward swinging movements of the control rod control the speed of forward or rearward movement of the vehicle. Rotation of the control rod on the longitudinal axis controls steering of the vehicle by differentially controlling the displacement of each pump. Adjustable stop members limit movement of the control rod to predetermine the limit of rotary speed of the drive members in forward or reverse directions, and a pair of centering springs urge the control rod toward its neutral position of both speed and steering control. A hydraulic shock absorber is operatively connected to the control apparatus to dampen shock load and to smooth the control operation.

BRIEF DESCRIPTION OF THE DRAWINGS

FIG. 3, is an enlarged fragmentary detail partly in top plan and partly in section, taken substantially on the line 3—3 of FIG. 2;

FIG. 4, is an enlarged fragmentary view in side elevation corresponding to a portion of FIG. 2, some parts being broken away and some parts being shown in section;

FIG. 5 is an enlarged view corresponding to a portion of FIG. 3 and showing different positions of some of the parts;

FIG. 6 is a fragmentary detail, partly in front elevation and partly in section, taken on the line 6—6 of FIG. 4.

DETAILED DESCRIPTION OF THE PREFERRED EMBODIMENT

Figure 1:
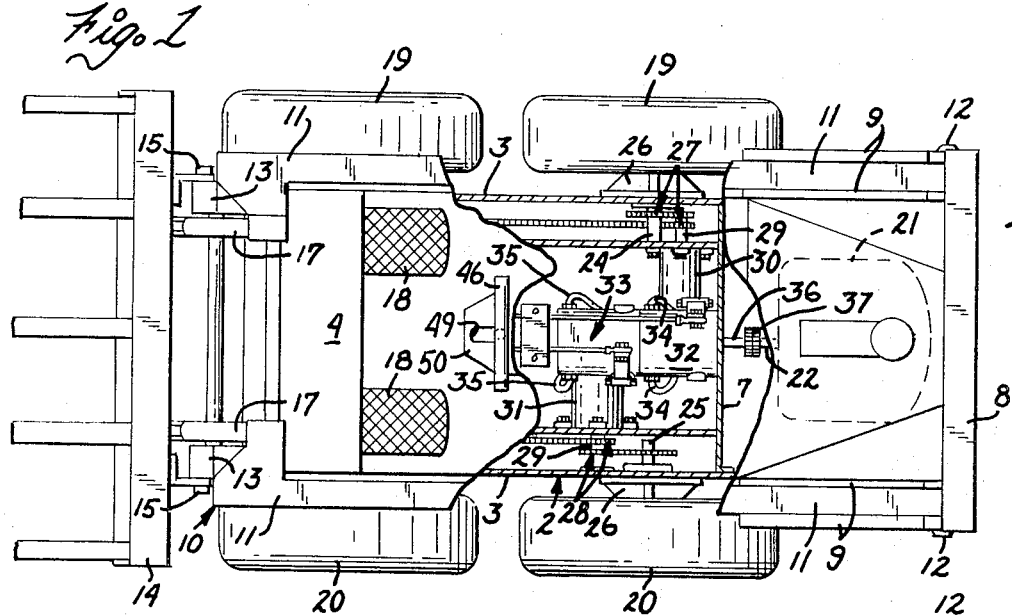
FIG. 1 is a view in top plan of a vehicle incorporating the control apparatus of this invention, some parts being broken away and some parts being shown in section.
Figure 2:
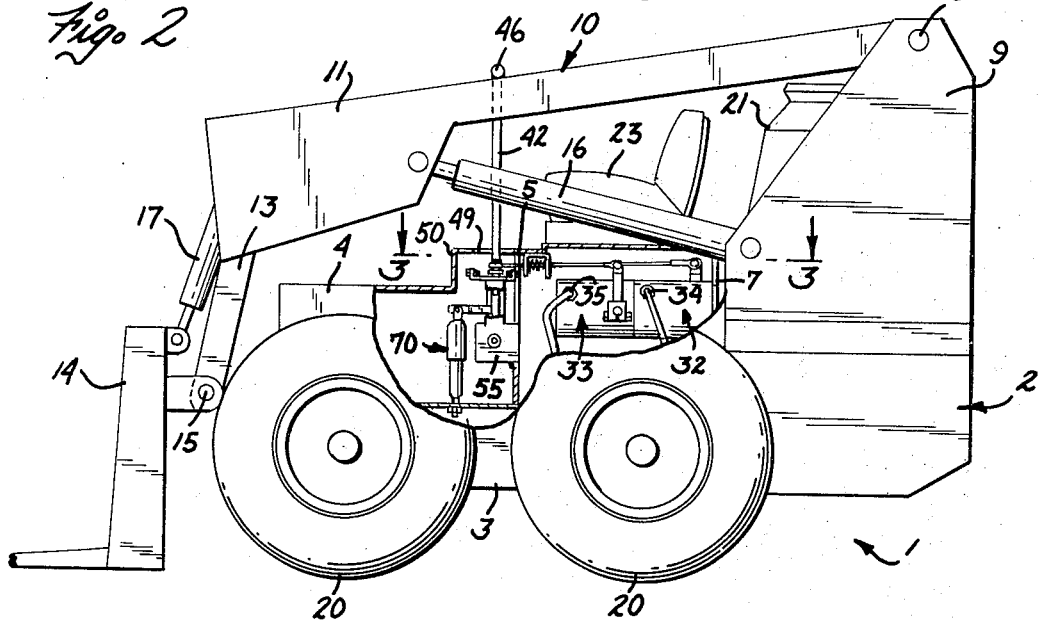
FIG. 2, is a view in side elevation of the vehicle of FIG. 1, some parts being broken away and some parts being shown in section.

The control apparatus of this invention is shown in FIGS. 1 and 2 as being applied to a wheeled vehicle, indicated generally at 1. The vehicle 1 may be of any desired type, but for the purpose of the present example, is shown as being in the nature of a self-propelled loader having a frame 2. The frame 2 includes a pair of laterally spaced longitudinal hollow frame members 3, cross frame members 4, 5, 6, 7, and 8, and upstanding frame members 9 at the rear end portion of the vehicle, the frame members 9 supporting a lifting boom 10. The lifting boom 10 includes a pair of laterally spaced arms 11 pivotally secured at their rear ends to the upright members 9, as indicated at 12, the front ends of the arms 11 having depending portions 13 that are pivotally connnected to laterally spaced portions of a lifting bucket or fork 14, as indicated at 15. The boom 10 is provided with a pair of laterally spaced hydraulic piston-equipped cylinders 16, one of which is shown in FIG. 2, for raising and lowering the bucket or fork 14. Tilting movements of the bucket 14 are effected in the usual manner by a pair of hydraulic piston-equipped cylinders 17. Operation of the cylinders 16 and 17 may be assumed to be controlled by a pair of pedals 18 in a conventional manner.

The vehicle thus far described is of well-known construction, and in and of itself, does not comprise the instant invention. Hence, in the interest of brevity, further detailed showing and description thereof is omitted. It should suffice to state that the vehicle is supported by a pair of drive wheels 19 and 20 at opposite sides of the frame 2 and driven by means of a prime mover in the nature of an internal combustion engine 21 suitably mounted on the frame 2 at the rear end of the vehicle 1 and having a drive shaft 22 extending forwardly therefrom. An operator's seat 23 is suitably mounted on the cross frame member 5 forwardly of the engine 21, see FIG. 2.

The wheels 19 and 20 are mounted on drive shafts 24 and 25 respectively, these shafts being journalled in bearings 26 mounted on the frame members 3. The shafts 24 and 25 are operatively connected by conventional chain drive mechanisms 27 and 28 respectively to the output shafts 29 of a pair of hydraulic drive motors 30 and 31 respectively, see FIG. 1. The hydraulic motors 30 and 31 are each operatively connected to a respective one of a pair of variable displacement hydraulic pumps 32 and 33, by suitable fluid conduits 34 and 35 respectively. The pumps 32 and 33 are preferably connected together in tandem relationship and have a common input or driving shaft 36 that is connected to the drive shaft 22 of the engine 21 by a conventional shaft coupling 37, see FIG. 1. The fluid pressure operated motors 30 and 31 are of a well-known type, and are preferably of the fixed displacement variety utilizing wobble plates connected to the output shafts thereof, the wobble plates being rotated by a plurality of circumferentially spaced pistons. For the purpose of the present example, the motors 30 and 31 are manufactured by the Cessna Fluid Power Division of Cessna Aircraft Company of Hutchinson, Kan., under their Model No. 74614-DAD. The pumps 32 and 33, as above stated are of the variable displacement type, and, for the purpose of the present example, may be assumed to be of the swash plate and cooperating circumferentially spaced piston variety. Such pumps are also available from the Cessna Fluid Power Division under their Model No. 78112-RAA. As is well known to those familiar with pumps and motors of this type, displacement of the pump and the direction of fluid output thereof is regulated or controlled by varying the angle of the wobble plate, not shown. In the pumps 32 and 33, the displacement and direction of discharge of fluid therefrom is controlled by control arms 38 and 39 respectively, fixed to respective control shafts 40 and 41.

The control arms 38 and 39 with their respective control shafts 40 and 41 between neutral positions shown in FIGS. 1-4 and indicated in FIG. 4 by dot and dash lines N and full forward and full reverse positions indicated by dot and dash lines F and R respectively in FIG. 4. In the forward positions F of the control arms 38 and 39, their respective hydraulic motors 30 and 31 are rotated in directions to propel the vehicle 1 forwardly; and, at the positions R of the control arms 38 and 39, the hydraulic pumps 32 and 33 deliver fluid under pressure to their respective hydraulic motors 30 and 31 in directions to cause the vehicle 1 to be driven in a reverse direction. It will be appreciated that, in various positions of movement of the control arms 38 and 39 between their neutral positions and full forward or full reverse positions, the hydraulic motors 30 and 31 are driven at various speeds, the arrangement being such that the fluid delivery to the motors 30 and 31 is infinitely variable.

Means for imparting movements to the control arms 38 and 39 comprises an elongated control rod 42 and a pair of rigid control links 43 and 44 that extend generally longitudinally of the vehicle 1, and which, at their rear ends, are pivotally connected to the free ends of the control arms 38 and 39 respectively by swivel connections 45.. At its upper end, the control rod 42 is provided with a transverse handle member 46. Intermediate its ends, the control rod 42 has welded or otherwise rigidly secured thereto a control bar 47 that extends transversely thereof in a direction parallel to the handle member 46. The front ends of the links 43 and 44 are pivotally connected to the control bar 47 at diametrically opposite sides of the control rod 42, by swivel connections 48 similar to the connections 45. Above the control bar 47 and swivel connections 48, the control rod 42 projects upwardly through a slot 49 in a housing portion 50 secured to the cross frame members 4 and 5. The lower end of the control rod 42 is journaled in aligned bearings 51 in a generally vertically disposed upwardly opening socket 52 for rotation on the axis of the control rod 42. The lower end of the socket 52 is welded or otherwise rigidly secured to the intermediate portion of an elongated transverse bearing 53 journaled on a pivot shaft 54 that is mounted adjacent its opposite ends in a generally U-shaped bracket 55 rigidly mounted on the cross frame member 6 of the frame 2. The axis of the shaft 54 is generally horizontally disposed and extends transversely of the frame 2 and the axis of the control rod 42. The socket 52, tubular bearing 53, shaft 54 and bracket 55 cooperate to provide means for mounting the control rod 42 for forward and rearward swinging movements relative to the frame 1, and for rotary movements on its own axis. The upper ends of the bracket 55 have welded or otherwise rigidly mounted theron a pair of forwardly and rearwardly elongated support members 56 and 57 each having upturned front and rear lugs 58 and 59 respectively. The lugs 58 are connected by a cross bar 60 secured thereto by machine screws or the like 61. A pair of laterally spaced nut-equipped stop screws 62 are screw-threaded into the cross bar 60 laterally inwardly of the lugs 58 and a similar pair of lock nut equipped stop screws 63 have screw threaded engagement with suitable openings in the lugs 59, the stop screws 62 and 63 being disposed in the path of travel of the control bar 47. The stop screws 62 limit forward swinging movement of the control rod 42, links 43 and 44 and control arms 38 and 39, whereby to limit forward speed of the vehicle. In like manner, the stop screws 63 engage the control bar 47 to limit rearward movement of the control rod 42, links 43 and 44, and control arms 38 and 39, whereby to limit rearward speed of the vehicle.

When the stop screws 62 are properly adjusted relative to each other, and the stop screws 63 are adjusted in like manner, and the control rod 42 is moved forwardly or rearwardly about the axis of the shaft 54 until the control bar 47 engages both of either of the screws 62 or 63, forward or rearward movement of the vehicle will be in a straight line. A neutral position of the control rod 42 and parts connected thereto is shown in FIGS. 3 and 4 and by full lines in FIG. 5. When it is desired to move forwardly, the operator moves the control rod 42 forwardly. In turning the vehicle, it is only necessary to rotate the control rod 42 on its own axis to cause one of the pairs of wheels 19 or 20 to rotate faster than the other pair thereof. The dotted line position of the control rod 42 and control bar 47 in FIG. 5 indicates that the machine is moving forward and that the control link 44 is moved forwardly further than the control rod 43, so that the wheels 20 are caused to rotate at a greater speed than the wheels 19. Thus, by manipulating the handle member 46 to rotate the control rod 42 in either direction from a straight forward direction, the vehicle will turn in that direction. The degree of rotation imparted to the control rod 42 determines the diameter of the turning circle of the vehicle. The minimum diameter turning circle is determined by the forward or rearward speed of the vehicle. Assuming that the vehicle is being driven in a straight ahead direction at full speed, the control bar 47 is in engagement with the heads of both stop screws 62. When the operator wishes to turn the vehicle at full speed, and rotates the control rod 42 in the direction of the desired turn, one of the pairs of wheels 19 or 20 will be caused to run at a slower speed than the other pair, the other pair being held against greater speed by engagement of the corresponding side of the control arm 47 with its respective stop screw 62. The same condition holds true when the vehicle is being driven at full speed in reverse.

When the control rod 42, links 43 and 44, and control arms 38 and 39 are in their neutral positions, rotation of the control rod 42 on its own axis will cause one pair of wheels 19 and 20 to rotate in a forward direction while the other pair thereof rotates on a reverse direction. Thus, the vehicle partakes of a "spin" turn on its own axis. One pair of wheels can be made to run in reverse while the other pair thereof run forwardly only at the slowest speeds of the vehicle and the faster the vehicle is driven either in forward or reverse, the greater becomes the minimum turn circle diameter. This arrangement provides a safety factor, not only to minimize danger of spilling whatever load is carried by the bucket or fork 14, but also minimizes the danger of tipping of the vehicle by an inexperienced operator.

A safety feature of the present invention resides in centering mechanism for the control rod 42, comprising a pair of coil compression centering springs 64 each encompassing a different one of the rigid links 43 and 44. An inverted generally U-shaped frame member 65 is rigidly secured to the cross frame member 5 and includes a pair of depending flanges 66 that are spaced apart in a direction longitudinally of the vehicle 1, the flanges 66 having aligned openings in the form of notches 67 through which the links 43 and 44 extend, see particularly FIGS. 3 and 5. The springs 64 are disposed between the flanges 66 and have interposed between their opposite ends and the flanges 66 stop washers 68 that are slidable on their respective links 43 and 44 and which have an outer diameter greater than the width of the notches 67 to confine the springs 64 between the flanges 66. The links 43 and 44 are screw-threaded to receive abutment elements in the form of lock nut-equipped abutment nuts 69 by means of which compressive bias of the springs 64 may be equalized against each flange 66 when the control arms 38 and 39 and the control rod 42 are disposed in their neutral positions. With this arrangement, the springs 64 automatically move the control arms 38 and 39 and the control rod 42 to their neutral positions when the handle member 46 is released by the operator. It will be noted, with reference to FIGS. 3 and 5, that the notches 67 are of a size to permit the movement therethrough of the abutment 69 so that, when the control rod 42 is moved away from its neutral position, the springs 64 are compressed toward one or the other of the flanges 66 of the frame member 65.

For the purpose of cushioning the control rod 42 against shock loads which may be generated by the pumps 32 and 33 during operation of the vehicle, and for reducing the tendency toward too sudden movement of the control rod 42 by the operator, damping means is provided in the nature of a commercially available double acting tubular shock absorber 70, including telescoping portions 71 and 72, the former of which is pivotally secured to a rigid arm 73 projecting transversely outwardly from the socket 52, the latter being connected to a vehicle frame portion 74, as indicated at 75. The shock absorber or damper 70 prevents sudden movement of the control rod 42 about the axis of the shaft 54 so that forward and rearward movement of the control arms 38 and 39 is gradual and smooth. In like manner, any movements which may be generated by the running gear and transferred through the hydraulic system through the control arms 38 and 39 are effectively dampened by the shock absorber 70 before being transferred to the operator's hands on the handle member 46.

DESCRIPTION OF THE MODIFIED ARRANGEMENT

Figure 7:
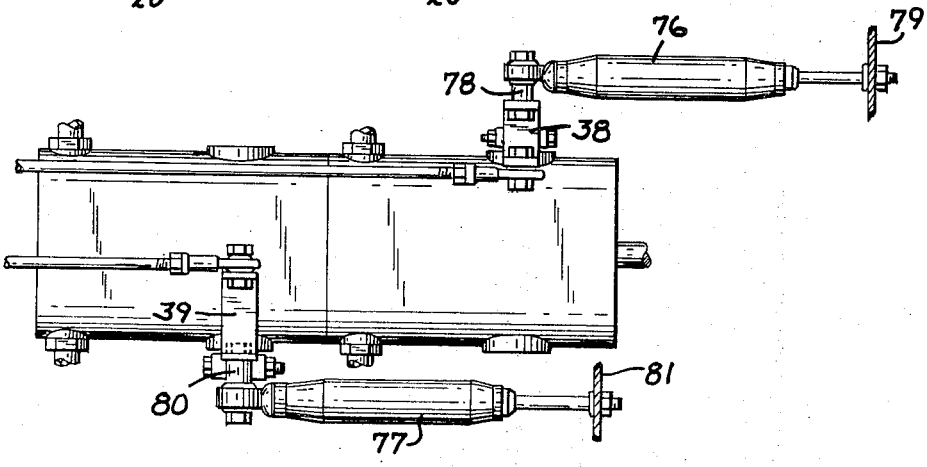
FIG. 7 is a view corresponding to a portion of FIG. 3, but showing a modified arrangement.

In the modified form illustrated in FIG. 7, the shock absorber 70 is replaced by a pair of similar shock absorbers 76 and 77, the former of which is connected at one end to the control arm 38 by means of a nut-equipped bolt and spacer element 78, and to a portion 79 of the frame 1. In like manner, one end of the shock absorber 77 is connected to the control arm 39 by a screw and spacer arrangement, indicated at 80 and at its other end to the cross frame member 7, as indicated at 81. By using a pair of shock absorbers 76 and 77 in lieu of the single shock absorber 70 of FIGS. 1-4, both control arms 38 and 39 are dampened against unwanted sudden movements and shock loads so that rotational movement of the control rod 42 on its longitudinal axis is dampened as well as forward and rearward swinging movement thereof.

This invention has been thoroughly tested and found to be completely satisfactory for the accomplishment of the objectives set forth; and, while I have shown and described a preferred embodiment of the control apparatus, and a single modified arrangement, it will be understood that the same is capable of further modification without departure from the scope and spirit of the invention, as defined in the claims.

What is claimed is:

1. Control apparatus for a hydraulic drive mechanism for a vehicle including a frame and a pair of rotary members at opposite sides of the frame, said drive mechanism including a pair of hydraulic drive motors each connected to a different one of said rotary members, a pair of variable displacement pumps each hydraulically coupled to a different one of said motors and each having a pivotally mounted displacement control arm thereon movable in directions to control operation of its respective pump to impart infinitely variable speed to its respective motor selectively in forward and reverse directions or rotation, and means for driving said pumps, said control apparatus comprising:
   a. An elongated control rod having a handle at one of its opposite ends;
   b. mounting means mounting said control rod for swinging movements on an axis extending transversely of said control rod and for pivotal movements on an axis extending longitudinally of said control rod;
   c. a control bar fixed on said rod in longitudinally spaced relation to said mounting means and extending in diametrically opposite directions transversely of said control rod and generally transversely of said vehicle;
   d. a pair of rigid links connected to said control bar at generally diametrically opposite sides of said longitudinally extending axis and each to a different one of said control arms for imparting pivotal movements to said control arms selectively to control the rate of forward and rearward speed of the vehicle responsive to swinging movements of the control rod on said transverse axis and to control the steering of the vehicle responsive to pivotal movements of the control rod on said longitudinal axis;

e. front and rear pairs of stop elements each engaging said control bar adjacent a different end thereof to limit said movements of the control rod in directions away from said neutral position thereof;

f. and yielding means urging said control rod toward a neutral position intermediate the limits of both swinging and pivotal movements thereof, said links disposing both said control arms in neutral positions between forward and reverse directions of pumping movement of their respective pumps when said control rod is moved to said neutral position thereof.

2. The control apparatus defined in claim 1, characterized by a pair of double acting shock absorbers each having a portion connected to a different one of said pump control arms and another portion connected to said frame for retarding and cushioning said movements of the control arms and links.

3. The control apparatus defined in claim 1 in which said yielding means comprises a pair of centering springs each operatively engaging a frame member carried by said frame and a different one of said links, and each being under yielding bias to urge its respective link selectively in opposite directions to move said control rod toward its neutral position from all positions spaced from said neutral position.

4. The control apparatus defined in claim 3 in which said frame member includes a pair of front and rear flanges spaced apart in a direction longitudinally of said links and extending transversely of said links, said flanges having laterally spaced pairs of aligned openings therethrough for reception of said links, each of said links including a pair of axially spaced abutment elements fixed thereon and movable through respective ones of said openings, characterized by a pair of washers slidably mounted on each of said links between and engaging said abutment elements, said washers being disposed between said flanges and of a size to prevent passage thereof through said flange openings, each of said centering springs being a coil compression spring encompassing its respective link between the washers thereon and urging said washers into engagement with an adjacent one of said flanges and the abutment elements on its respective link.

5. The control apparatus defined in claim 1, characterized by damping means comprising a double acting fluid shock absorber operatively connected to said control rod for retarding and cushioning said movements of the control rod links.

6. The control apparatus defined in claim 5 in which said shock absorber includes a pair of telescoping elements one connected to said frame and the other connected to said control rod mounting means.

* * * * *